United States Patent

[11] 3,625,258

| [72] | Inventor | Rex V. Phelps<br>Tulsa, Okla. |
|---|---|---|
| [21] | Appl. No. | 19,825 |
| [22] | Filed | Mar. 16, 1970 |
| [45] | Patented | Dec. 7, 1971 |
| [73] | Assignee | Warren Petroleum Corporation<br>Tulsa, Okla. |

[54] MULTIPASSAGE PIPE
2 Claims, 5 Drawing Figs.

| [52] | U.S. Cl. | 138/115 |
|---|---|---|
| [51] | Int. Cl. | F16l 9/18 |
| [50] | Field of Search | 138/115,<br>116, 117 |

[56] References Cited
UNITED STATES PATENTS

| 111,727 | 2/1871 | Conley | 138/115 |
|---|---|---|---|
| 1,668,179 | 5/1928 | Williams | 138/115 X |
| 2,420,715 | 5/1947 | Millward | 138/116 |
| 3,110,754 | 11/1963 | Witart | 138/115 X |

*Primary Examiner*—Herbert F. Ross
*Attorneys*—Meyer Neishloss, Deane E. Keith and Paul L. Tillson ABSTRACT: A multichannel pipe of reduced wall thickness and increased rigidity consists in a plurality of elongated strips welded along their lateral edges to one another. The strips are of arcuate shape in a direction transverse to their length to form a tubular structure. Webs extend from each juncture of two strips across the pipe to another juncture. The angles included by the arcs of the strips are such that the angle at which the strips and the webs meet is larger than 90°. The radius of curvature of the arcs on which the strips are curved is less than the radius of a circle having the same cross-sectional area as the pipe. In the preferred method of manufacture of the pipe the web structure is assembled and the arcuate strips then welded to one another and the ends of the webs.

INVENTOR.
REX V. PHELPS

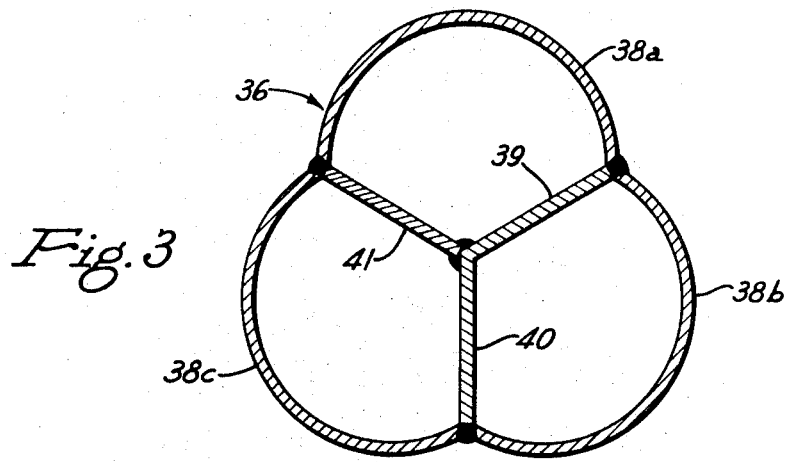
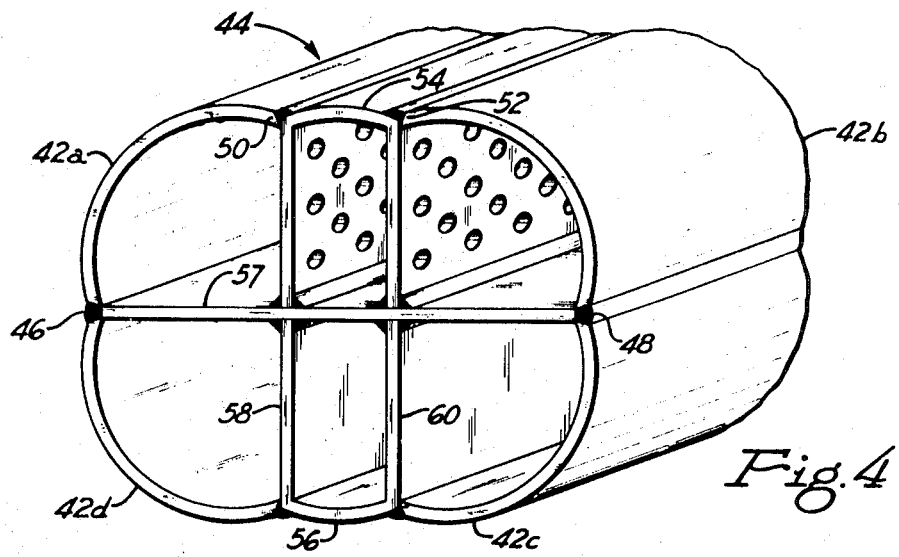
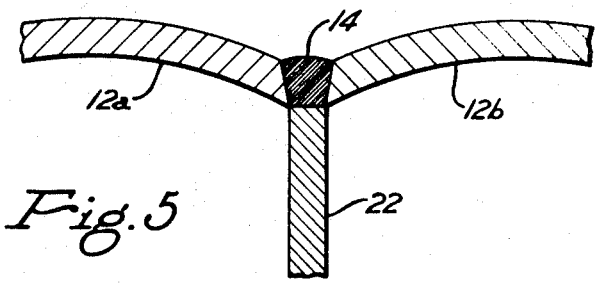
INVENTOR.
REX V. PHELPS

MULTIPASSAGE PIPE

This invention relates to pipe and more particularly to steel pipe of large size that can be easily transported and assembled in the field near the location at which the pipe is used.

Most pipe used for the transportation of fluids is of circular cross section. Such pipe can be easily fabricated and allows an economical use of the steel from which the pipe is made. However, if the size of the pipe is large, for example larger than 36 inches in diameter, cylindrical pipe is not wholly satisfactory. Large cylindrical pipe is easily distorted from its cylindrical shape by ordinary handling with the result that it is difficult to weld joints of the pipe together when it is laid. Moreover, cylindrical pipe is weak in compression transverse to its length and may be flattened when the pipe is covered by backfill.

Many large diameter pipelines are used to transport water, oil or gas through areas remote from pipe fabrication plants. Cylindrical pipe cannot be nested and when stacked leaves a large percentage of empty space. Since transportation costs are based on volume as well as weight, the transportation costs for large sizes of cylindrical pipe are high.

Sometimes it is desirable to transport several fluids from one point of origin to a single destination. The usual procedure has been to lay separate pipes for each fluid. The use of separate pipes has the disadvantage of an uneconomical use of steel and may require a substantially larger trench in addition to the disadvantages mentioned above for pipe of large sizes. If it is desirable to heat one fluid as it passes through a pipeline, tracing a pipeline with a second pipe for a heating fluid is usually an inefficient method of transferring heat from the fluid in one pipe to the fluid in another.

This invention relates to pipe, which can be economically shipped to remote areas and fabricated near the location at which the pipe is laid, consisting of elongated arcuate strips welded along their lateral edges to form a hollow tube. Webs extend from the junctures of the strips across the pipe to other junctures. It is contemplated that the pipe will be assembled near the location at which it is laid. The arcuate strips and the webs are of a shape such that they can be nested or stacked in a manner that greatly reduces empty space and thereby reduces transportation costs.

In the drawings:

FIG. 3 is a transverse sectional view across the bottom of this invention in which the pipe is constructed of three elongated strips welded to one another along the lateral edges.

FIG. 4 is an oblique view of a pipe utilizing this invention showing how the size of the pipe can be increased.

FIG. 5 is an enlarged fragmentary sectional view of the juncture of strips and webs used in constructing the pipe of this invention.

Figure 1:
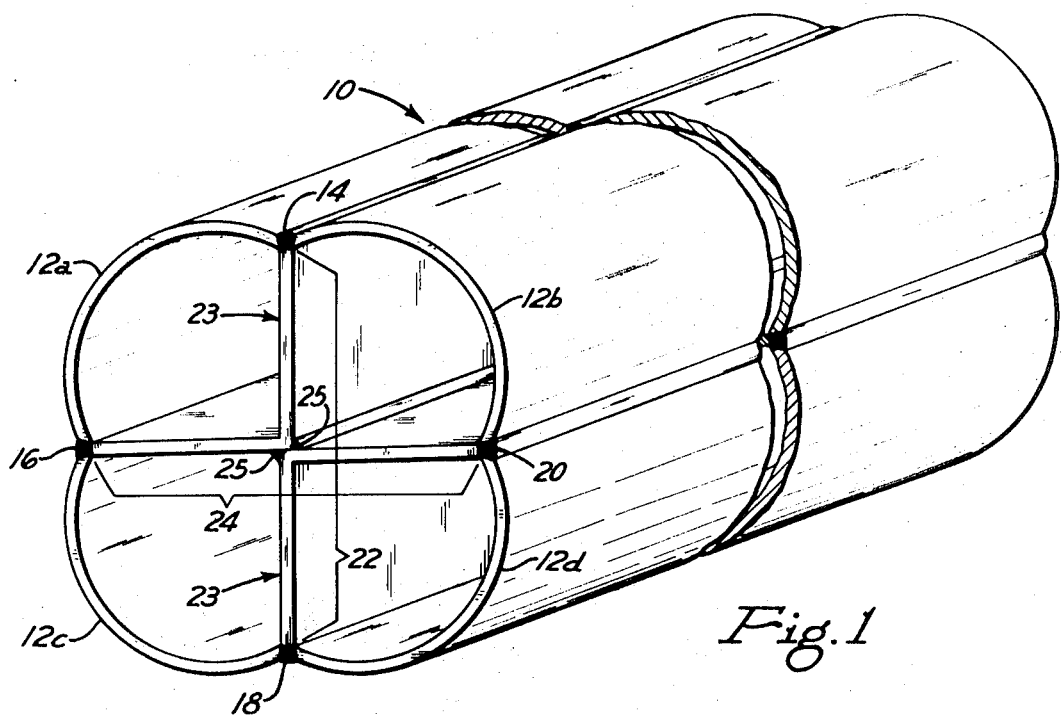
FIG. 1 is an oblique view of a pipe constructed according to this invention of four elongated arcuate strips.

Referring to FIG. 1 of the drawings, a pipe indicated generally by reference numeral 10 is shown constructed of elongated arcuate strips 12a, 12b, 12c and 12d. Strips 12a and 12b are welded together along their lateral edges at a juncture 14 extending the length of the arcuate strips 12a and 12b. Similarly strips 12a and 12c are welded together along their lateral edges at a juncture 16, strips 12c and 12d are welded together at a juncture 18, and strips 12b and 12d are welded together at a juncture 20 to form a hollow tube. A web 22 extends across the tube from juncture 14 to juncture 18 and a web 24 extends across the tube from juncture 16 to juncture 20. In the preferred form of the invention illustrated in FIG. 1, the webs are formed by angles indicated generally by reference numeral 23 welded together at 25 so that one leg of one angle provides a continuation of a leg of the other angle to form a web.

It is contemplated that the pipe will be assembled in a portable pipe-fabricating plant near the location where the pipe is to be laid. The arcuate strips 12 and angles 23 can be shaped, and beveled for welding, in a plant fully equipped to bend, cut, and shape steel, and shipped to the portable pipe-fabricating plant which requires only welding machinery. The shapes of strips 12 and angles 23 allow them to be nested during shipment. The pipe could, of course, be assembled completely at the plant that shapes the strips 12 and angles 23, but the advantage of reducing the volume of the pipe during transportation would be lost.

In the manufacture, the angles 23 are welded together at 25 to form the desired web structure illustrated in FIG. 1. Then two of the arcuate strips are welded together along their lateral edges and to one end of the web. For example, strips 12a and 12b are welded to web 22 and to each other as illustrated in FIG. 5. The welding of the strips and webs is repeated to complete each of the junctures.

Figure 2:
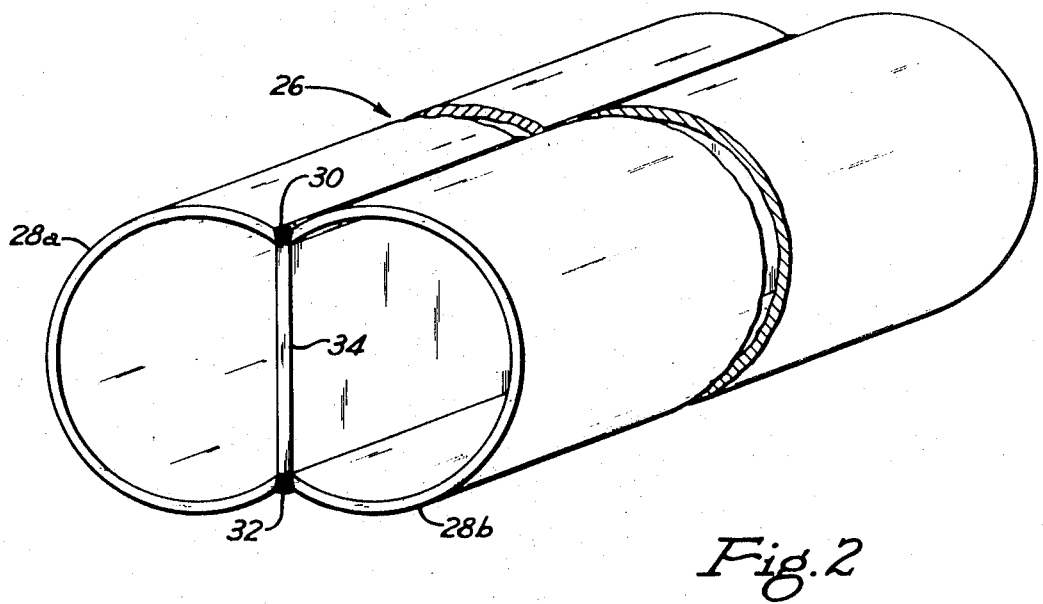
FIG. 2 is an oblique view similar to FIG. 1 of a pipe employing this invention having two passages through it.

Referring to FIG. 2 of the drawings, a pipe indicated generally by reference numeral 26 is shown with two elongated strips 28a and 28b of arcuate shape transverse to their length shown welded together along their lateral edges to form junctures 30 and 32. A web 34 is welded to the strips 28a and 28b at the juncture 30 and extends across the tube enclosed by elongated strips 28a and 28b to juncture 32 and welded to the edges of the elongated strips at that juncture. The arcs of strips 28a and 28b exceed 180°; hence, the cross-sectional area of the pipe 26 is larger than the cross-sectional area of a circular pipe having the same radius of curvature as the arcuate elongated strips 28a and 28b. The small radius of curvature of the arcuate strips and the web 24 increase the rigidity of the pipe. As in the pipe illustrated in FIG. 1, it is contemplated that in the actual manufacture of the pipe, the welding of the strips and webs at each juncture will be performed in a single operation joining the strips and welds in a single weld.

A pipe indicated generally by reference numeral 36 consisting of three elongated arcuate strips 38a, 38b and 38c welded together along their lateral edges to one another and to steel ribbon 41 or the flanges 40 and 39 of an angle extending the length of the pipe is illustrated in FIG. 3. Flanges 40 and 39 preferably are at an angle of approximately 120° and ribbon 41 is welded at the outer surface of the angle at an angle of approximately 120° with each of the flanges. Thus, in the embodiment of the invention illustrated in FIG. 3, each web consists of either ribbon 39 and one of the flanges, or two of the flanges. Manufacture of the pipe is preferably accomplished by welding the ribbon to the angle to form the web structure and then welding the strips 38a, 38b, and 38c together and to the ends of the web to complete the pipe.

FIG. 4 of the drawings illustrates how the concept of this invention can be utilized to construct a pipe of any desired cross-sectional area. Four enclosing arcuate strips 42a, 42b, 42c and 42d are used to close the "corners" of the pipe indicated generally by reference numeral 44. Arcuate strips 42a and 42d are welded together along their adjacent lateral edges at juncture 46. Similarly, arcuate strips 42b and 42c are welded together along their lateral edges at juncture 48. The space between the lateral edge 50 of strip 42a and 52 of 42b is filled by a widening strip 54. Widening strip 54 is welded along its lateral edges to strips 42a and 42b. Similarly, a widening strip 56 is welded to the lateral edges of arcuate strips 42d and 42c. Widening strips 54 and 56 are of arcuate shape in transverse cross section and preferably have the same radius of curvature as the enclosing strips 42a, 42b, 42c and 42d. Any number of widening strips can be used to increase the size of the pipe to the desired cross-sectional area.

Pipe 44 has a web 57 that extends across the pipe from juncture 46 to juncture 48 and is welded to the arcuate strips at those junctures. Similarly, transverse webs 58 and 60 extend across the pipe from the junctures along the lateral edges of widening strip 56 to the junctures along the edges of widening strip 54. In the embodiment illustrated in FIG. 4, webs 58 and 60 are illustrated as being perforated above web 57; however, imperforate webs illustrated in the other embodiments of the invention can be used. As in the other embodiments of the invention, the preferred method of manufacturing the pipe is to assemble the web structure and then weld the strips together along their lateral edges and to the ends of the webs.

The elongated strips that are welded together along their lateral edges to form a tube have an arcuate shape on a cross section perpendicular to the length of the strips. The radius of curvature of the arc is less than the radius of a circle having the same cross-sectional area as the completed pipe constructed in accordance with this invention. The arc of the elongated strips in degrees exceeds $360/n$ where $n$ is the number of "enclosing strips." Enclosing strips are those strips that when welded contribute to the encircling of the space within the pipe for the full 360°. In contrast, the widening strips 54 and 56 in FIG. 4 continue the wall of the pipe in the direction of the enclosing strips. The number of enclosing strips is two for the embodiment of the invention illustrated in FIG. 2, three for the embodiment of the invention illustrated in FIG. 3, and four for the embodiment of the invention illustrated in FIG. 1 and FIG. 4.

It is preferred that the arcs of the enclosing strips not exceed 180° to allow the strips to be nested for shipment to the point of sender. It is apparent that the embodiment of the invention illustrated in FIG. 2 requires the strips to include an arc exceeding 180° to derive the benefit of small radius of curvature of the arc for a given cross-sectional area of the pipe. The arcuate strips 28a and 28b can be deformed sufficiently without exceeding their elastic limit to permit nesting if the size of the finished pipe is equivalent to a 36-inch circular pipe or larger and may include an arc ranging from about 210° to 240°. The arcuate strips 38a, 38b and 38c preferably include an arc of 140° up to 180°, and the arcuate strips 12a, 12b, 12c and 12d include an arc in the range of 110° to 180°. The widening strips 54 and 56 in the embodiment of the invention illustrated in FIG. 4 should preferably include an arc equal to the amount by which the arcuate strips 42a, 42b, 42c and 42d exceed 90°. Because the arcs of enclosing strips exceed $360/n°$, and the strips are convex outwardly, the internal angle between each web and the arcuate strips to which it is welded exceeds 90°. Each web is spaced from the center of curvature of the arcuate strips to which that web is welded a distance less than the radius of curvature of the strips.

The pipe of this invention is readily assembled in a portable pipe-making plant near the location at which the pipe is to be laid requiring only the welding together of the arcuate strips and the web. All shaping of the arcuate sections can be accomplished at a fully equipped metal-working plant and the elongated strips and webs transported to the job site in a convenient form for assembly on the job. The small radius of curvature of the arcuate strips and the webs contribute to the rigidity of the pipe and reduce the danger of the pipe being bent out of shape.

The multichannel pipe is advantageous in situations where more than one fluid is to be transported. For example, it may be desirable to separate gases from the liquid hydrocarbons produced on the North Slope of Alaska before shipment. In some instances, it may be desirable to ship, for example, crude oil and gas in one direction through two of the passages in pipe 36 and return products through the other passage in the pipe. If it is desirable to heat one or more fluids, the pipe of this invention is advantageous because of the high rate of heat transfer that may be obtained through webs separating channels of the pipe.

An important advantage of this invention is a saving in weight of steel required for pipe of a given cross-sectional area as compared with circular pipe of the same cross-sectional area and pressure rating. The small radius of curvature of the strips and the webs extending across the pipe reduce the wall thickness required for the pipe to withstand pressure within the pipe and also increase the structural integrity of the pipe to thereby reduce the chances of the pipe being deformed either by handling before the pipe is laid or by compression after the pipe is laid and covered with fill.

The added structural integrity is particularly advantageous in pipe that is suspended above ground level to cross difficult terrain such as ravines and solid rock, and to cross rivers. The multicylinder arrangement gives the pipe characteristics similar to a beam. If added rigidity is desired for a long span, it can be easily attained by an increase in the thickness of the vertical webs.

I claim:

1. A pipe comprising four arcuate enclosing strips curved transversely to their length and located in a convex outwardly orientation with the center of curvature of one of the enclosing strips at each corner of a rectangle, arcuate widening strips curved transversely to their length having substantially the same radius of curvature as the enclosing strips and extending in a convex outwardly orientation from the lateral edge of one enclosing strip to the lateral edge of an adjacent enclosing strip spaced therefrom to complete the pipe wall between spaced apart lateral edges of the enclosing strips, and a web connected to each juncture of lateral edges of the strips and extending across the pipe to a directly opposed juncture; the internal angle at the intersection of the webs and the strips exceeding 90°, the enclosing strips including an arc of 110° to 180°, and the widening strips including an arc substantially equal to the arc by which the enclosing strips exceed 90°.

2. A pipe comprising four arcuate enclosing strips curved transversely to their length located in a convex outwardly orientation with the center of curvature of one of the enclosing strips at each corner of a rectangle, two adjacent enclosing strips being welded together along their adjacent lateral edges and the other two of the enclosing strips being welded together along their adjacent edges, arcuate widening strips extending in a convex outwardly orientation between and joined to adjacent free lateral edges of the enclosing strips to complete the pipe wall between those lateral edges, the radius of curvature of the widening strips being substantially the same as the radius of curvature of the enclosing strips, and a web connected to each juncture of the lateral edges of the strips and extending across the pipe to a directly opposed juncture; the internal angle at the intersection of the web and the strips exceeding 90°, the enclosing strips including an arc of 110°–180°, and the widening strips including an arc substantially equal to the arc by which the enclosing strips exceed 90°.

* * * * *